United States Patent [19]

Nagahata et al.

[11] Patent Number: 5,825,016

[45] Date of Patent: Oct. 20, 1998

[54] FOCUS DETECTION DEVICE AND ACCOMPANYING OPTICAL EQUIPMENT

[75] Inventors: Junko Nagahata, Osaka; Hiroshi Ueda, Habikino; Akio Kinba, Suita; Tsuyoshi Kishimoto, Hannan; Tatsuo Nakashima, Matsubara, all of Japan

[73] Assignee: Minolta Co., Ltd., Osaka, Japan

[21] Appl. No.: 611,697

[22] Filed: Mar. 6, 1996

[30] Foreign Application Priority Data

Mar. 7, 1995 [JP] Japan .................................. 7-047299

[51] Int. Cl.⁶ .................................................. G01B 9/06
[52] U.S. Cl. ................. 250/201.8; 396/80; 396/104; 396/128
[58] Field of Search ........................ 250/201.8, 201.7; 396/80, 82, 123, 124, 128

[56] References Cited

U.S. PATENT DOCUMENTS

| | | | |
|---|---|---|---|
| 4,483,602 | 11/1984 | Aoki et al. | 354/402 |
| 4,851,657 | 7/1989 | Taniguchi et al. | 250/201 |
| 4,862,204 | 8/1989 | Ishida et al. | 354/408 |
| 4,864,117 | 9/1989 | Ishida et al. | 250/201 |
| 5,001,507 | 3/1991 | Iida et al. | 354/402 |
| 5,202,555 | 4/1993 | Ishida et al. | 250/201.8 |
| 5,602,944 | 2/1997 | Yokoyama et al. | 382/278 |

FOREIGN PATENT DOCUMENTS

| | | |
|---|---|---|
| 63-17417 | 1/1988 | Japan . |
| 2-251924 | 10/1990 | Japan . |

*Primary Examiner*—Edward P. Westin
*Assistant Examiner*—Alan L. Giles
*Attorney, Agent, or Firm*—Sidley & Austin

[57] ABSTRACT

Where a person is being photographed, for example, both light from the person located at closer range and light from the background located farther away enter the photodetector elements. Where the contrast of the background is high, the rate at which the information from the background contributes to the focus detection becomes larger, which hinders accurate focus detection with regard to the person. In this case, the focus detection device divides a predetermined focus area into smaller areas and detects focus condition in each smaller area.

19 Claims, 16 Drawing Sheets

FOCUS DETECTION DEVICE AND ACCOMPANYING OPTICAL EQUIPMENT

BACKGROUND OF THE INVENTION

1. Field of the Invention

The present invention pertains to a focus detection device that detects the focal status of the object lens with regard to the object of observation or of photo-taking, and optical equipment accompanying the device, such as cameras, binoculars and various measuring devices.

2. Description of the Related Art

Optical equipment equipped with a focus detection device includes, as far as single lens reflex cameras are concerned, for example, a camera in which the light from the photo object that enters through the photo-taking lens, which is the object lens, is received by photodetector elements such that the degree to which the image is out of focus may be detected and the lens may be automatically adjusted to the focus position (in-focus position) of the photo-taking lens that corresponds to the distance between the camera and the photo object. A camera of this type has a pair of left and right photodetector elements so that a part of the light entering through the photo-taking lens may be received by the left and right photodetector elements, and the out-of-focus amount is detected based on the positional relationship between the left and right images on these photodetector elements. Then, based on the result thus detected, focus adjustment is performed by driving the lens using a motor located in order to drive the photo-taking lens.

In detecting the focus, however, not only the light from the main photo object but also the light from the background enters the photodetector elements. Where a person is being photographed, for example, both light from the person located at closer range and light from the background located farther away enter the photodetector elements. Where the contrast of the background is lower than that of the person located closer to the camera, the rate at which the information from the background contributes to focus detection is small and therefore the out-of-focus amount for the person closer to the camera can be accurately detected. However, where the contrast of the background is high, the rate at which the information from the background contributes to the focus detection becomes larger, which hinders accurate focus detection with regard to the person. Such a phenomenon will be called as 'the coincidence of closer and farther objects' in this specification. If focus adjustment for the photo-taking lens is performed based on the result of focus detection in this situation, the camera ends up focusing on a point halfway between the person and the background.

On the other hand, cameras in which the focus detection area may be switched have been proposed. For example, a camera in which switching may take place between multiple areas and one area and a camera in which an area to be used for detection may be selected from one line sensor and these areas can be switched from one to another are available. However, with all of these cameras, the user needs to manually make selections best suited to the situation of the photo object prior to the commencement of the focus detection routine. Using these constructions, not only the operation is troublesome but also it is difficult to quickly respond to changes in the situation of the photo object.

SUMMARY OF THE INVENTION

The object of the present invention is to provide a focus detection device that can perform accurate focus detection as to the target object when an object targeted for focus detection and another object exist at different distances (when the coincidence of closer and farther objects is present).

Another object of the present invention is to provide a focus detection device that can determine whether or not the situation of the object field contains the coincidence of closer and farther objects and perform the focus detection calculation best suited for the situation present as well as optical equipment accompanying the device.

Yet another object of the present invention is to provide optical equipment accompanying a focus detection device that can perform focus detection with regard to the target object in a situation where the coincidence of closer and farther objects is present without requiring any special operation.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1A:
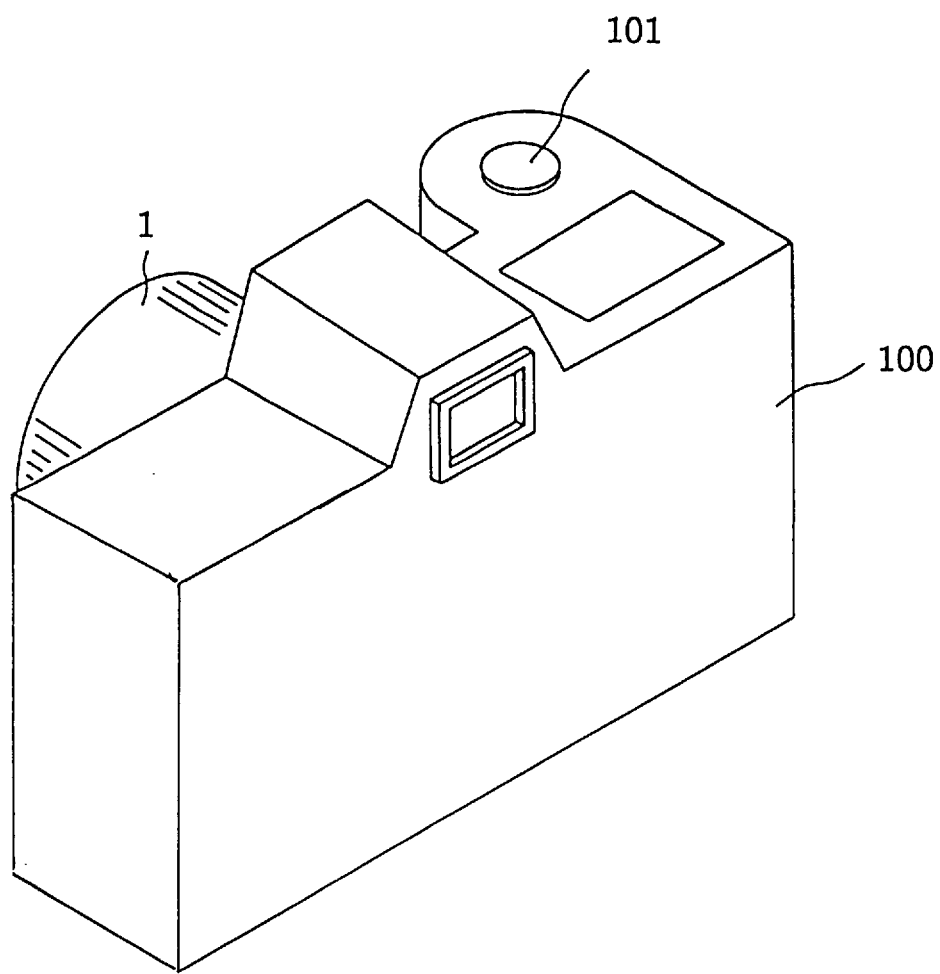
FIG. 1A is a drawing that shows an external view of a single lens reflex camera, a first embodiment of the present invention.
Figure 1B:
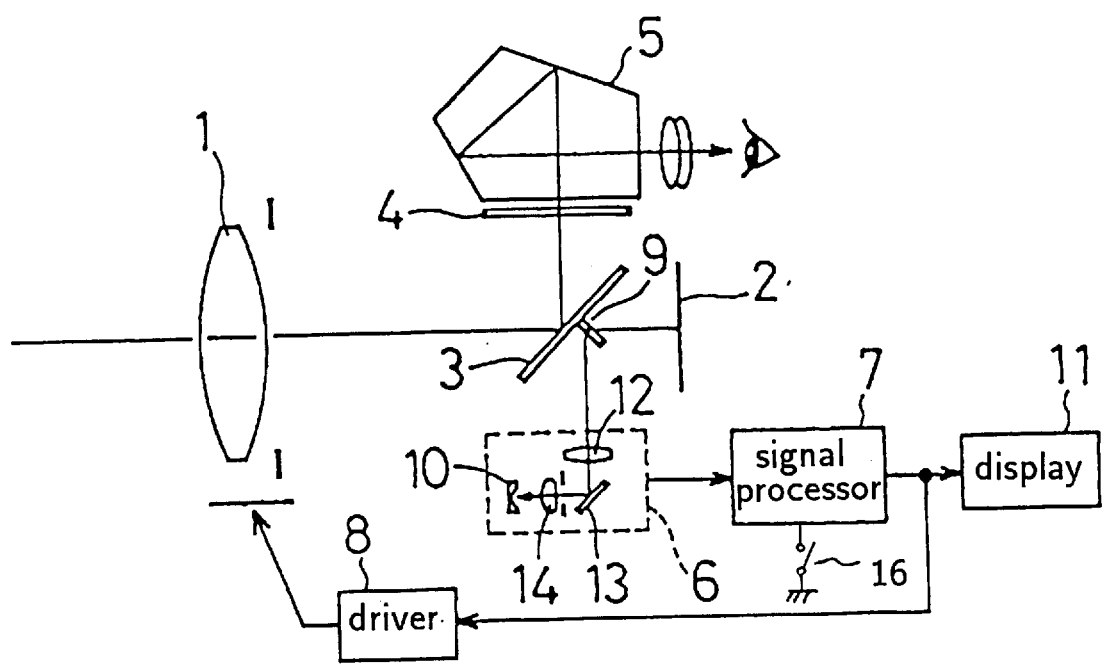
FIG. 1B is a schematic construction drawing of a single lens reflex camera, the first embodiment of the present invention.

As a focus detection device of the present invention and an accompanying camera, FIG. 1A shows the external view of a first embodiment, a single lens reflex camera in which the present invention is applied, and FIG. 1B shows its schematic construction. Photo-taking lens 1 is mounted in front of camera body 100. Photo-taking lens 1 is constructed such that it may be detachably mounted to the camera body 100, while various interchangeable photo-taking lenses having different focal distances, full aperture values, etc. are available. Photo-taking lens 1 comprises multiple lens units, each of which comprises a single lens, and the focus position for photo-taking lens 1 is adjusted by some of the lens units (focus position adjustment units) moving along the optical axis.

Photographic film 2 is provided in the rear part of the camera body 100. Photo-taking takes place by exposing photographic film 2 to the light passing through photo-taking lens 1. An image having its focus on photographic film 2 is formed and a clear image is obtained by setting the focus position of photo-taking lens 1 in accordance with the distance between the camera and the photo object.

Reflecting mirror 3 is located in front of photographic film 2, and focusing screen 4 and pentagonal roof prism 5 are located above reflecting mirror 3. Reflecting mirror 3 is retractably located in the optical path from photo-taking lens 1 to photographic film 2. It ordinarily resides in the optical path and reflects the light passing through photo-taking lens 1 upwardly. When shutter release button 101 is operated, reflecting mirror 3 retracts from the optical path so as not to prevent the light from reaching photographic film 2.

The light reflected upwardly by reflecting mirror 3 forms an image on focusing screen 4, which the camera user can observe through pentagonal roof prism 5. The distance between the point at which the optical axis crosses reflecting mirror 3 and photographic film 2 and the distance between the point and focusing screen 4 are set to be equal, so that when the lens 1 is in focus vis-a-vis photographic film 2 it is also in focus vis-a-vis focusing screen 4 and the user can observe a clear image.

The reflecting mirror 3, focusing screen 4 and pentagonal roof prism 5 are public domain components of a single lens reflex camera. Since the camera of this embodiment is an automatic focus adjusting camera, it also has a focus detection device comprising photodetector unit 6, signal processor 7 and a photo-taking lens driving device 8 comprising a motor. In addition, the center area of reflecting mirror 3 is formed to allow partial light transmission and small auxiliary reflecting mirror 9 is fixed behind the center area of reflecting mirror 3. Photodetector unit 6 of the focus detection device is located under auxiliary reflecting mirror 9. Some of the light passing through photo-taking lens 1 passes through the center area of reflecting mirror 3 and is led to photodetector unit 6 after being reflected downwardly by auxiliary reflecting mirror 9.

Photodetector unit 6 has line sensor 10, which detects the light from auxiliary reflecting mirror 9 and outputs an electric signal. This output is processed by signal processor 7 in the manner described below, and the out-of-focus amount and direction relative to the in-focus position are detected. Signal processor 7 comprises a computer. It outputs a defocus signal containing information regarding the out-of-focus amount and direction and provides it to photo-taking lens driving device 8.

Photo-taking lens driving device 8 drives the focus position adjustment units of photo-taking lens 1 based on the defocus signal by means of a motor and establishes the focus position for photo-taking lens 1. In order to inform the user of the focal status, the camera of this embodiment also has display device 11, which displays in-focus information when the in-focus state is present based on the defocus signal from signal processor 7.

Figure 2:
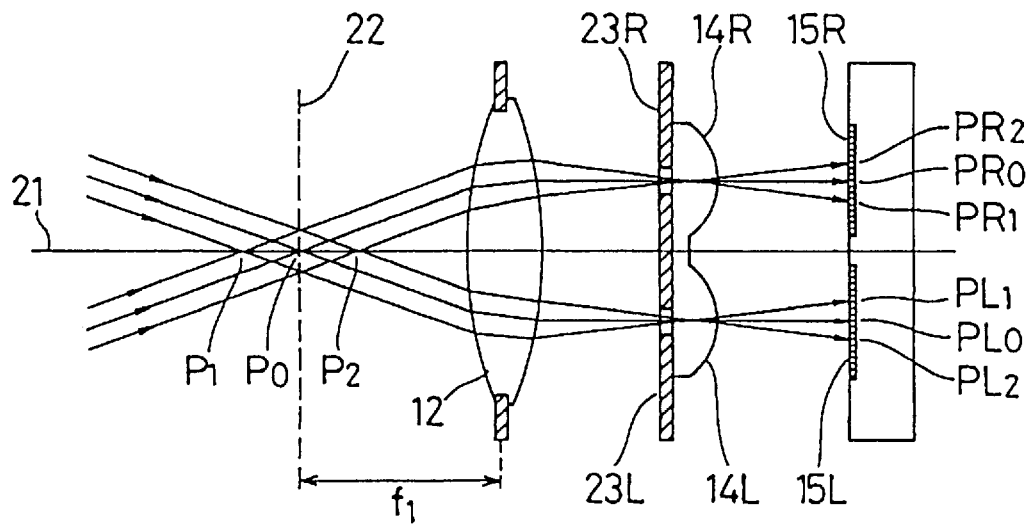
FIG. 2 is a drawing that shows an optical system of the light receiving unit of the focus detection device pertaining to the first embodiment.

Photodetector unit 6 has condenser lens 12, reflecting mirror 13 and image forming lens unit 14 to lead the light from auxiliary reflecting mirror 9 to line sensor 10, as shown in FIG. 1B. Reflecting mirror 13 is used in order to reduce photodetector unit 6 in size by bending the optical path and is not necessarily essential for the light detection by line sensor 10. FIG. 2 shows the optical system of photodetector unit 6 excluding reflecting mirror 13.

In FIG. 2, straight line 21 corresponds to the optical axis of photo-taking lens 1. Dotted line 22 indicates a plane equivalent to the exposure surface of photographic film 2. The distance between the point at which the optical axis of photo-taking lens 1 crosses auxiliary reflecting mirror 9 and exposure equivalent plane 22 is equal to the distance between the point at which the optical axis of photo-taking lens 1 crosses auxiliary reflecting mirror 9 and the exposure surface of photographic film 2. In other words, the length of optical path from photo-taking lens 1 to exposure equivalent plane 22 and the length of optical path from photo-taking lens 1 to photographic film 2 are the same.

Condenser lens 12 is located at a position away from exposure equivalent plane 22 by as much as focal length f1 of condenser lens 12. Behind condenser lens 12 is located a pair of left and right image forming lenses 14L and 14R, which are symmetrically located on either side of optical axis 21. Located in front of these image forming lenses 14L and 14R are field of view restricting masks 23L and 23R that have openings of a prescribed size. These field of view restricting masks 23L and 23R restrict the diameter of the light beams entering image forming lenses 14L and 14R and allow only light beams of a certain diameter to reach line sensor 10.

As line sensor 10 to receive light, a pair of left and right CCDs (charge coupled devices) 15L and 15R are used in this embodiment. These CCDs 15L and 15R are located on the image forming planes of image forming lenses 14L and 14R such that they are perpendicular to the optical axes of image forming lenses 14L and 14R. A single long CCD may be used in place of a pair of left and right CCDs, and left and right images from image forming lenses 14L and 14R may be received at different areas of the single CCD.

In photodetector unit 6 of the construction, the light from auxiliary reflecting mirror 9 is made to converge by condenser lens 12 after it passes through exposure equivalent plane 22. It then passes through the openings of field of view restricting masks 23L and 23R and arrives at image forming lenses 14L and 14R. The light passing through left and right image forming lenses 14L and 14R forms images on the light receiving surfaces of left and right CCDs 15L and 15R, respectively. The focal lengths of condenser lens 12 and of image forming lenses 14L and 14R and the distances from exposure equivalent plane 22 to condenser lens 12, image forming lenses 14L and 14R and the light receiving surfaces of CCDs 15L and 15R are designed such that the image on exposure equivalent plane 22 is re-formed on left and right CCDs 15L and 15R.

Because condenser lens 12 is located away from exposure equivalent plane 22, even if condenser lens 12 receives scratches or dust on its surface, the formation of clear images of such scratches or dust on the light receiving surfaces of CCDs 15L and 15R is prevented. Images of scratches and dust on condenser lens 12 have an adverse effect on focus detection regarding the photo object as 'noise', but blurred images have little impact on focus detection and therefore the adverse effects of scratches and dust can be reduced with condenser lens 12 located in the above fashion.

Field of view restricting masks 23L and 23R are designed such that their openings let pass only the portion of the light passing through photo-taking lens 1 that can pass through an opening equivalent to a certain aperture value, F5.6, for example, considering their relationships to condenser lens 12 and the widths of light receiving areas of CCDs 15L and 15R. When light rays which are vignetted in the peripheral areas are received by CCDs 15L and 15R, light does not reach the edges of CCDs 15L and 15R, as a result of which the light measurement range is reduced and the range within which the out-of-focus amount may be detected becomes small. By setting the openings of field of view restricting masks 23L and 23R in the manner described above, where various interchangeable lenses are used as photo-taking lens 1, as long as the lens' full aperture value is smaller than F5.6, the inconvenience that CCDs 15L and 15R receive light that is vignetted in part by the masking member of the photo-taking lens itself may be avoided, such that most normally used interchangeable lenses may be employed.

In FIG. 2, points P0, P1 and P2 on optical axis 21 indicate the positions of an image in the in-focus, front focus and rear focus state relative to one point in front of photo-taking lens 1, respectively. The light entry points from image positions P0, P1 and P2 to left CCD 15L are PL0, PL1 and PL2, respectively, while the entry points to right CCD 15R are PR0, PR1 and PR2, respectively.

Figure 3:
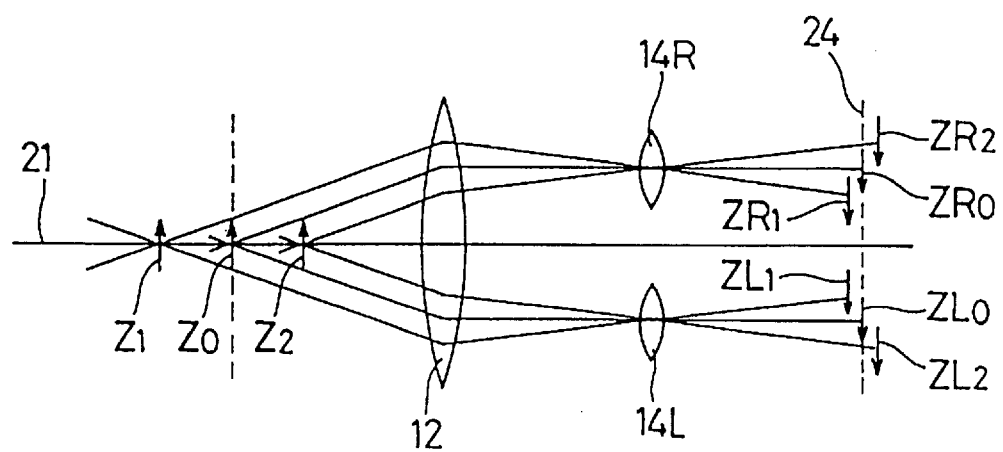
FIG. 3 is a drawing that shows the positional relationships among the re-formed images in the in-focus, front-focus and rear-focus states in the first embodiment.

FIG. 3 shows the positional relationships among the re-formed images in the in-focus, front-focus and rear-focus states. In-focus image Z0 re-forms an image on light receiving surface 24 of CCDs 15L and 15R and becomes ZL0 and ZR0. Re-formed images of front-focus image Z1 are ZL1 and ZR1, which are positioned in front of the light receiving surfaces of CCDs 15L and 15R and are closer to optical axis 21 than re-formed in-focus images ZL0 and ZR0. On the other hand, re-formed images of rear-focus image Z2 are ZL2 and ZR2, which are positioned behind the light receiving surfaces of CCDs 15L and 15R and are farther away from optical axis 21 than re-formed in-focus images ZL0 and ZR0. Therefore, front-focus image Z1 becomes slightly blurred enlarged images and rear-focus image Z2 slightly blurred reduced images on the light receiving surfaces of CCDs 15L and 15R.

As is clear from FIG. 3, the positions of images detected by left and right CCDs 15L and 15R reflect the focal status, i.e., in-focus, front focus or rear focus. By comparing the left and right image positions on left and right CCDs 15L and 15R, the focal status can be detected. Since left and right CCDs 15L and 15R are fixed in the camera and their positional relationship is constant, the out-of-focus amount and direction can be learned from the distance between the left and right images of the photo object. The focus detection method using the focus detection device of the present invention is explained in detail below.

Figure 4:
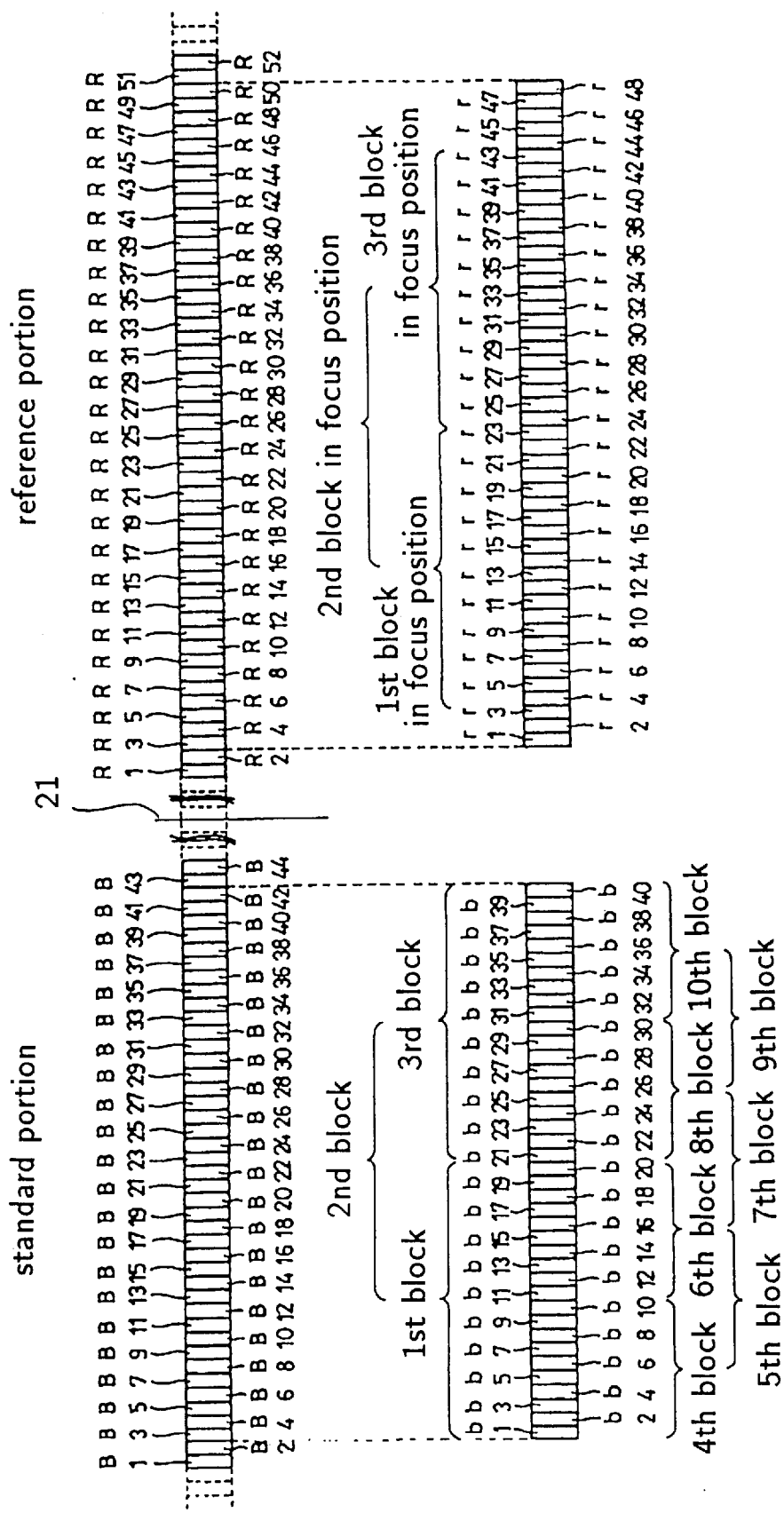
FIG. 4 is a drawing that shows the arrangement of pixels in the standard portion and the reference portion of the first embodiment.

FIG. 4 is a drawing which shows the arrangement of pixels of CCDs 15L and 15R and the arrangement of these pixels after filtering. Left CCD 15L has 44 pixels B1 through B44 while right CCD 15R has 52 pixels R1 through R52. The outputs of left and right CCDs 15L and 15R, or in other words, the pixel values of pixels B1 through B44 and R1 through R52, indicate the amounts of light received. In order to compensate for the difference in sensitivity between left and right CCDs 15L and 15R such that the left and right output levels match, pixels B1 through B44 and R1 through R52 undergo filtering.

Specifically, the differences in value between pixels which are three pixels away from each other are sought: difference $b_1$ between B1 and B4 and difference $b_2$ between B2 and B5 are calculated, and this process is continued up to difference $b_{40}$ between B41 and B44 for left CCD 15L. Differences $r_1$ through $r_{48}$ are also calculated for right CCD 15R in the same manner. Through this filtering, the levels of pixels $b_1$ through $b_{40}$ and pixels $r_1$ through $r_{48}$ become uniformly identical, making comparison of the left and right images easy.

Pixels $b_1$ through $b_{40}$ will be called the standard portion and pixels $r_1$ through $r_{48}$ will be called the reference portion. The pixels in the standard portion are compared with the pixels in the reference portion in order to obtain the amount of displacement of the left and right images from the in-focus position. While the pixels of left CCD 15L are deemed the standard portion and the pixels of right CCD 15R are deemed the reference portion in this embodiment, the numbers of pixels for the left and right CCDs may be reversed such that the pixels of the right CCD are deemed the standard portion and the pixels of the left CCD are deemed the reference portion.

In focus detection, it is necessary to know which area of the image on left CCD 15L matches which area of the image on right CCD 15R. To accomplish this, the standard portion is divided such that multiple pixel blocks comprising adjacent pixels are established, as shown in FIG. 4, and each pixel block is compared with a number of pixels of the reference portion, the number being the same as the number of pixels in the block. The first, second and third pixel blocks each comprise twenty pixels $b_1$ through $b_{20}$, $b_{11}$ through $b_{30}$ and $b_{21}$ through $b_{40}$, respectively, and are used for regular focus detection. These pixel blocks share half of their pixels with their neighboring pixel blocks.

Where the coincidence of closer and farther objects is present in regular focus detection, the fourth through tenth pixel blocks each comprising ten pixels, half of the number of pixels in each of the first through third pixel blocks, are used. These fourth through tenth pixel blocks share half of their pixels with their neighboring pixel blocks. Their relationships with the first through third pixel blocks are such that the first pixel block is divided into the fourth through sixth pixel blocks, the second pixel block is divided into the sixth through eighth pixel blocks and the third pixel block is divided into the eighth through tenth pixel blocks. The fourth to tenth pixel blocks will be called sub-blocks.

The comparison between the standard portion and the reference portion is performed through correlation calculation using formula (1) or (2). Formula (1) is used for the first through third pixel blocks and formula (2) is used for the fourth through tenth sub-blocks.

$$H_n(k) = \sum_{j=1}^{20} |b_{10 \cdot (n-1)+j} - r_{j+k-1}| \ (k = 1, 2, \ldots, 29) \quad (1)$$

$$H_n(k) = \sum_{j=1}^{10} |b_{5 \cdot (n-4)+j} - r_{j+k-1}| \ (k = ks, ks+1, \ldots, ke) \quad (2)$$

In the formulae above, n indicates the number of the pixel block (1–10). Pixels $b_1$ through $b_{20}$ of the first pixel block are sequentially compared, using formula (1), to reference portion pixel groups $r_1$ through $r_{20}$ all the way up to $r_{29}$ through $r_{48}$, and non-match amounts $H_1(1)$ through $H_1(29)$, which are the totals of the absolute values of the differences in pixel values, are calculated. Second block pixels $b_{11}$ through $b_{30}$ and third block pixels $b_{21}$ through $b_{40}$ are also compared with reference portion pixel groups $r_1$ through $r_{20}$ all the way up to $r_{29}$ through $r_{48}$ using formula (1) in the same way, and 29 non-match amounts $H_2(1)$ through $H_2(29)$ and $H_3(1)$ through $H_3(29)$ are calculated respectively. In this way, correlation calculation is performed for the first through third pixel blocks over the entire area of the reference portion.

With regard to the fourth through tenth sub-blocks, correlation calculation is performed not over the entire reference portion but over a smaller range. In other words, using formula (2), the ten pixels of a sub-block are compared with reference portion pixels $r_{ks}$ through $r_{ks+9}$ to $r_{ke}$ through $r_{ke+9}$ and (ke−ks+1) non-match amounts $H_n(ks)$ through $H_n(ke)$ are calculated. The correlation calculation starting position ks and ending position ke are set based on the out-of-focus amount detected using one of the first through third pixel blocks.

The optical system of photodetector unit 6 is designed such that the first pixel block $b_1$ through $b_{20}$ of the standard portion matches the reference portion pixels $r_4$ through $r_{23}$, the second pixel block $b_{11}$ through $b_{30}$ matches pixels $r_{14}$ through $r_{33}$ and the third pixel block $b_{21}$ through $b_{40}$ matches pixels $r_{24}$ through $r_{43}$ when an in-focus state is present. In other words, the first through third block in-focus positions shown in the reference portion in FIG. 4 are the areas which respectively match the images of the first through third pixel blocks of the standard portion when the in-focus state is present. Accordingly, when the image of the photo object is formed on the first pixel block of the standard portion, an in-focus state is present if $H_1(4)$ is the smallest among the first pixel block non-match amounts $H_1(1)$ through $H_1(29)$, while a front focus state is present if any of $H_1(1)$ through $H_1(3)$ is the smallest and a rear focus state is present if any of $H_1(5)$ through $H_1(29)$ is the smallest.

Similarly, when the image of the photo object is formed on the second pixel block, an in-focus state is present if $H_2(14)$ is the smallest, while a front focus state is present if any of $H_2(1)$ through $H_2(13)$ is the smallest and a rear focus state is present if any of $H_2(15)$ through $H_2(29)$ is the smallest. When the image of the photo object is formed on the third pixel block, an in-focus state is present if $H_3(24)$ is the smallest, while a front focus state is present if any of $H_3(1)$ through $H_3(23)$ is the smallest and a rear focus state is present if any of $H_3(25)$ through $H_3(29)$ is the smallest.

Figure 5:
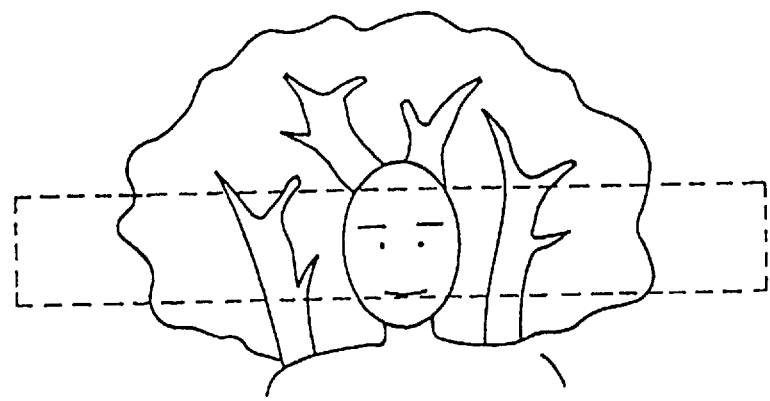
FIG. 5 is a drawing that shows an example of photo objects as to which the coincidence of closer and farther objects manifests.
Figure 6:
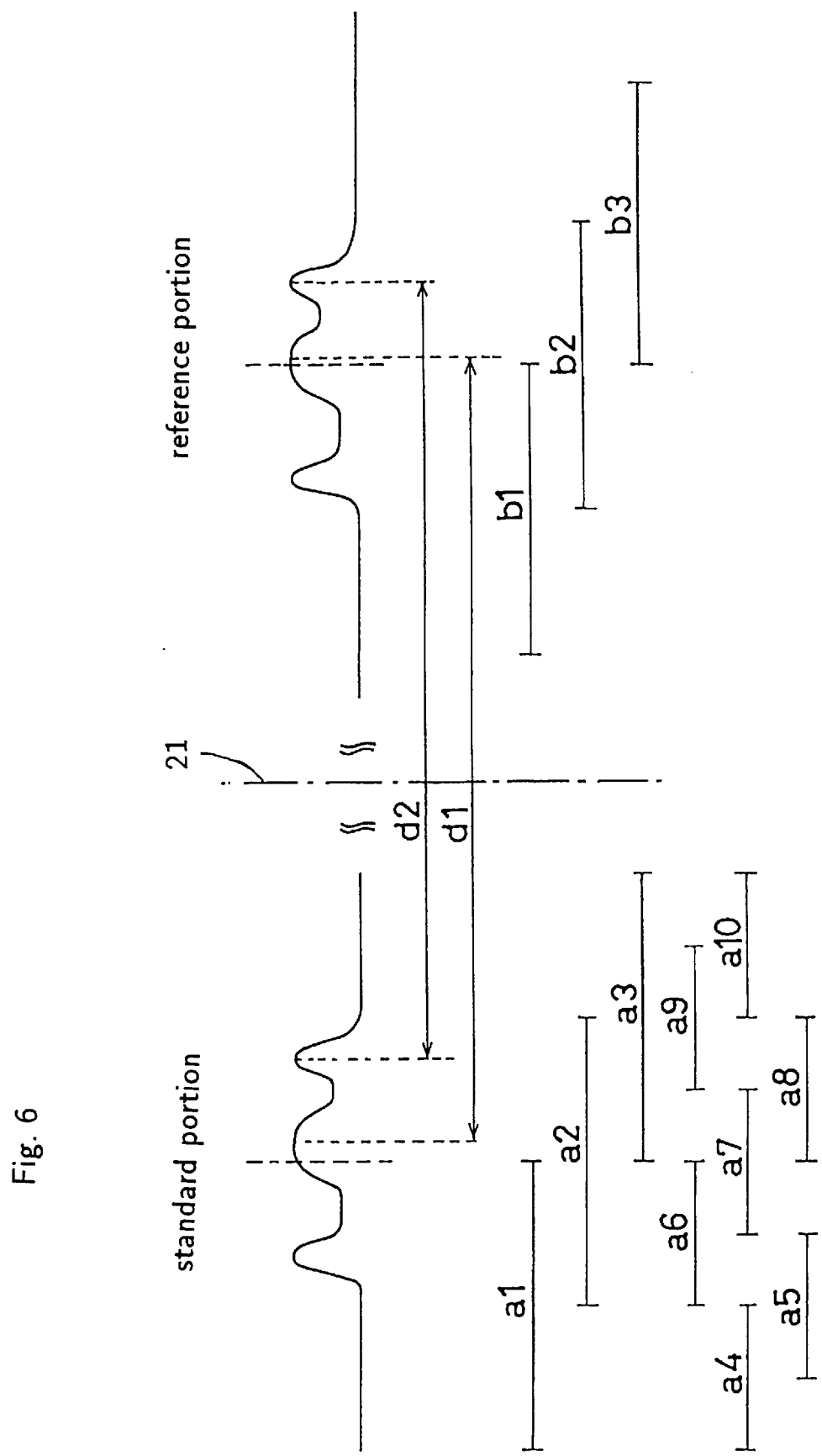
FIG. 6 is a drawing that shows pixel output from the standard portion and the reference portion that received light from the photo objects shown in FIG. 5.

FIG. 5 shows an example of photo objects where the coincidence of closer and farther objects occurs. FIG. 6 shows the output of left and right CCDs 15L and 15R that received light from the focus detection range indicated by a dotted line in FIG. 5. In FIG. 5, there is a tree behind a person, the main photo object. Since both objects have high contrasts, there are large output peaks in the base and reference units, as shown in FIG. 6. Since the tree in the background is located farther away from the camera than the person that is the main photo object, distance d2 between the left image and the right image of the background is smaller than distance d1 between the left image and the right image of the main photo object in FIG. 6.

In FIG. 6, $a_1$ through $a_{10}$ are focus detection areas corresponding to the first through tenth pixel blocks shown in FIG. 4, and $b_1$ through $b_3$ are in-focus areas corresponding to $a_1$ through $a_3$ of the standard portion, respectively. In FIGS. 5 and 6, the image of the main photo object is formed on the second pixel block. In regular focus detection, the out-of-focus amount is sought using the second pixel block.

The out-of-focus amount is detected as an amount of shift of the image on the reference portion from the in-focus position. For example, if $H_1(km)$ indicated the smallest value among the non-match amounts for the first pixel block, shift amount $xm_1$, for the first block can be obtained through (km−4). Shift amounts $xm_2$ and $xm_3$ for the second and third blocks can be obtained in the same manner. However, shift amounts $xm_1$, $xm_2$ and $xm_3$ are values expressed in number of pixels, and since the maximum accuracy is determined by the pitch of the arrangement of the pixels, the out-of-focus amount cannot be expressed with high accuracy.

Figure 7A:
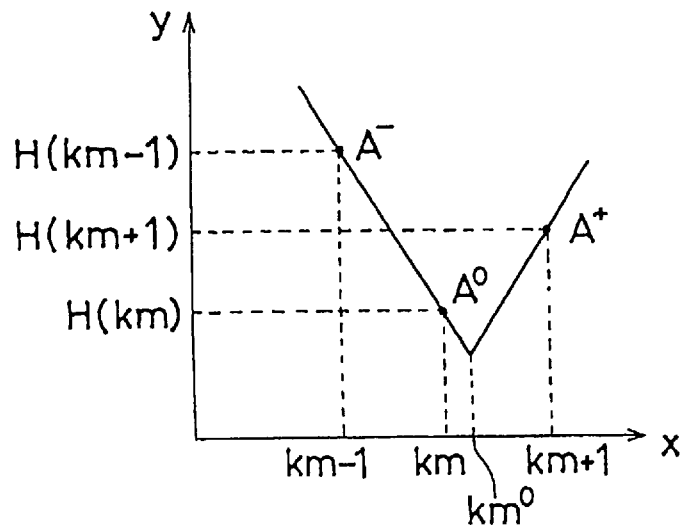
FIGS. 7a, 7b and 7c are drawings that show the interpolation regarding the shift amount between the left and right images in the first embodiment.
Figure 7B:
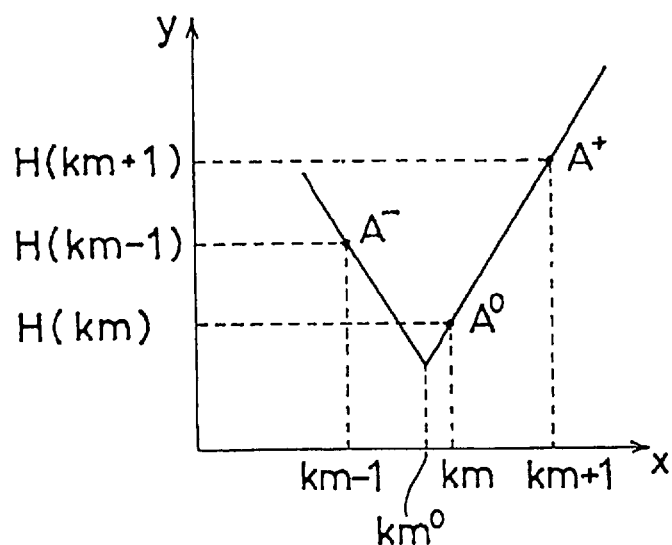

With the above as a background, in order to improve the accuracy of the shift amount, interpolation is performed using three points $A^-$(km−1,H(km−1)), $A^o$(km,H(km)) and $A^+$(km+1,H(km+1)) that correspond to reference portion position km that indicated the smallest non-match amount H(km) and positions (km−1) and (km+1) on both sides of position km. For the interpolation, linear approximation is employed as shown in FIGS. 7(a) and 7(b). Where H(km−1) is equal to or larger than H(km+1), a straight line that passes through two points $A^-$ and $A^o$ and a straight line that has an inclination of the same absolute value as the inclination of this line but the opposite sign and that passes through $A^+$ are assumed, as shown in FIG. 7(a), and the x coordinate of the point at which the two lines intersect is deemed km$^o$. Conversely, where H(km+1) is larger than H(km−1), a straight line that passes through two points $A^o$ and $A^+$ and a line that has an inclination of the same absolute value as the inclination of this line but the opposite sign and that passes through $A^-$ are assumed, as shown in FIG. 7(b), and the x coordinate of the point at which the two lines intersect is deemed km$^o$. If the larger of H(km−1) and H(km +1) is expressed as h, km$^o$ is given via formula (3) in either the situation of FIG. 7(a) or that of FIG. 7(b).

$$km^o = km + \frac{1}{2} \cdot \frac{H(km-1) - H(km+1)}{h - H(km)} \quad (3)$$

Figure 7C:
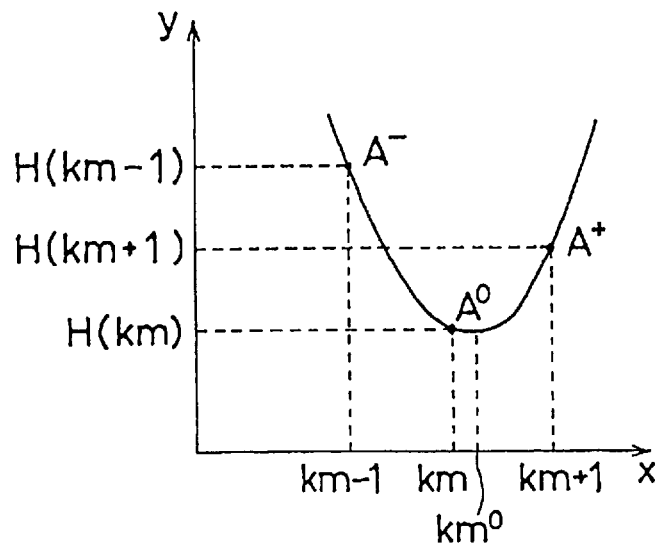

Interpolation may be performed by means of approximation using a parabola passing through three points $A^-$, $A^o$ and $A^+$ as shown in FIG. 7(c) instead of linear approximation, with the x coordinate of the peak of the parabola as km$^o$. In this case, km$^o$ is provided by formula (4).

$$km^o = km + \frac{1}{2} \cdot \frac{H(km-1) - H(km+1)}{H(km-1) + H(km+1) - 2 \cdot H(km)} \quad (4)$$

Shift amounts $XM_1$, $XM_2$ and $XM_3$ for the first through third pixel blocks after interpolation are obtained from reference portion position km$^o$ calculated in the manner described above. Post-interpolation first through third pixel block non-match amounts $YM_1$, $YM_2$ and $YM_3$ are given as a y coordinate corresponding to km$^o$.

Incidentally, the non-match amount that indicates the degree of non-matching between the standard portion image and the reference portion image is influenced by the contrast of the image. If the contrast is low, the non-match amount is reduced and a small non-match amount results even when an in-focus state is not present, which leads to an incorrect focus detection result that gives the impression that an in-focus state or a state closer to it is present. Therefore, in order to accurately discern the degree of non-matching between the left image and the right image, it is necessary to take the contrast into consideration and exclude pixel blocks having low contrasts from the focus detection process.

The contrast of a pixel block is defined using formula (5) or (6). Formula (5) is used for the first through third pixel blocks and formula (6) is used for the fourth through tenth sub-blocks. The aggregate of the absolute values of the differences in value between adjacent pixels is deemed contrast value $C_n$.

$$C_n = \sum_{j=1}^{10} |b_{10\cdot(n-1)+j} - b_{10\cdot(n-1)+j+1}| \quad (5)$$

$$C_n = \sum_{j=1}^{9} |b_{5\cdot(n-4)+j} - b_{5\cdot(n-4)+j+1}| \quad (6)$$

When contrast value $C_n$ for the nth pixel block obtained using formula (5) or (6) is smaller than prescribed small value $C_o$, it is determined that the pixel block has too low a contrast and therefore is not suitable for focus detection.

If the contrast is equal to or larger than prescribed value $C_o$, a block whose degree of non-matching with the reference portion is excessively large is determined not to be in-focus with regard to the main photo object and is excluded from focus detection. In other words, value $YM_n/C_n$ obtained by dividing post-interpolation non-match amount $YM_n$ for the nth block by contrast value $C_n$ is deemed to be the degree of image non-matching for that pixel block, and where degree of image non-matching $YM_n/C_n$ is larger than prescribed large value $(YM/C)_o$, that pixel block is deemed to be not suitable for focus detection.

When focus detection is possible with more than one pixel block, a single pixel block to be used for focus detection is selected based on post-interpolation shift amount $XM_n$. In this case, the pixel block having the largest post-interpolation shift amount $XM_n$ is selected. A large shift amount means a large degree of rear focus, which means that the image of the main photo object located closer to the camera is formed on that pixel block. Therefore, by selecting the pixel block having the largest shift amount, focus detection with regard to the main photo object becomes possible.

When two or more pixel blocks have the largest post-interpolation shift amount, the pixel block having the smallest degree of image non-matching $YM_n/C_n$ is selected from among them. By doing so, a pixel block which has a small non-match amount $YM_n$ and a large contrast value $C_n$ is selected.

In regular focus detection, correlation calculation is performed as described above regarding the first, second and third pixel blocks and a block to be used for focus detection is selected. Where the coincidence of closer and farther objects is not present in the selected pixel block, the out-of-focus amount is calculated from that pixel block's post-interpolation shift amount XM.

The presence or absence of the coincidence of closer and farther objects is determined based on object magnification β (a value obtained by dividing the focal length of the photo-taking lens by the distance between the camera and the photo object), contrast value C and degree of image non-matching YM/C for the selected pixel block. The larger object magnification β is, the more unlikely it becomes that the coincidence of closer and farther objects is taking place. Therefore, where object magnification β calculated in the previous focus detection routine is larger than prescribed value $β_a$, it is determined that the coincidence of closer and farther objects is not taking place.

The coincidence of closer and farther objects occurs when light from a photo object having a high contrast and located at a distance different from that of the main photo object is received, as where a main photo object is located at close range and another object having a high contrast is located at a farther distance, for example. In this situation, the distance between the image formed by the light coming from closer range and the image formed by the light coming from farther away differs between the standard portion and the reference portion, increasing the non-match amount. Therefore, when the coincidence of closer and farther objects is present, the selected pixel block has a contrast higher than a certain level and the degree of image non-matching becomes large. Accordingly, the presence or absence of the coincidence of closer and farther objects can be determined based on contrast value C and degree of image non-matching YM/C of the selected pixel block.

Figure 14:
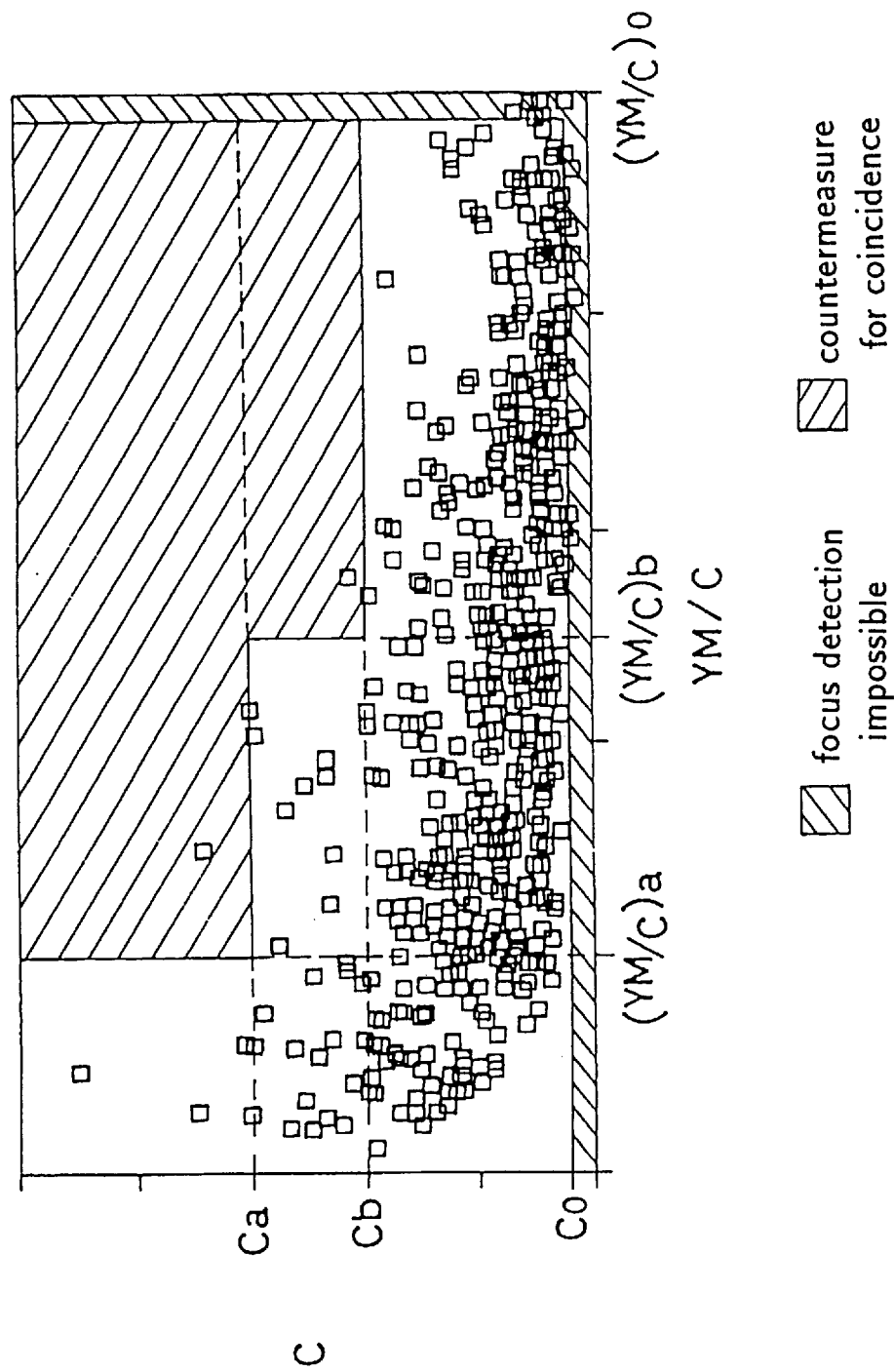
FIG. 14 is a drawing that shows the relationship between the contrast and the degree of image non-matching when it is determined that the coincidence of closer and farther objects is present, as well as the distribution of contrast values and degrees of image non-matching measured using two-dimensional photo objects.

FIG. 14 shows the relationship between the contrast and the degree of image non-matching when it is determined that the coincidence of closer and farther objects is present in this embodiment, together with the distribution of contrast values C and degrees of image non-matching YM/C actually measured using a number of two-dimensional photo objects. In this embodiment, determination regarding the presence or absence of the coincidence of closer and farther objects is performed by setting contrast C and degree of image non-matching YM/C in two stages. In other words, first prescribed value $C_a$ and second prescribed value $C_b$ that is smaller than first prescribed value $C_a$ are set on the contrast axis and first prescribed value $(YM/C)_a$ and second prescribed value $(YM/C)_b$ that is larger than first prescribed value $(YM/C)_a$ are set on the degree of image non-matching axis. Where contrast value C is equal to or larger than first prescribed value $C_a$ and degree of image non-matching YM/C is equal to or larger than first prescribed value $(YM/C)_a$, it is determined that the coincidence of closer and farther objects is present. Where contrast value C is equal to or larger than second prescribed value $C_b$ and degree of image non-matching YM/C is equal to or larger than second prescribed value $(YM/C)_b$, it is also determined that the coincidence of closer and farther objects is present. In other cases, it is determined that the coincidence of closer and farther objects is not present.

Although there are not many cases where it is determined that the coincidence of closer and farther objects is present in FIG. 14, in actual photo-taking situations in which three-dimensional photo objects are located at various distances, the number of situations requiring countermeasures to deal with the coincidence of closer and farther objects increases.

The focus detection routine when the coincidence of closer and farther objects is present will now be explained. When there is the coincidence of closer and farther objects, the block selected from among the first through third pixel blocks of the standard portion in regular focus detection is divided further and focus detection is then performed. As shown in FIG. 4, where the first block was selected, it is divided into three sub-blocks, the fourth through sixth blocks. Where the second block was selected, it is divided into three sub-blocks, the sixth through eighth blocks.

Where the third block was selected, it is divided into three sub-blocks, the eighth through tenth blocks.

Correlation calculation referring to the reference portion is then performed using formula (2) for each of the three sub-blocks. This correlation calculation is performed referring not to the entire area of the reference portion but to only a part of the unit. The area of the reference portion that matches the selected pixel block before it is further divided has a discrepancy from the focus position in FIG. 4 of shift amount xm expressed in number of pixels. Therefore, the nth sub-block should best match the area of the reference portion containing the $(5\cdot(n-4)+4+xm)$th pixel through the $(5\cdot(n-4)+13+xm)$th pixel, $r_5\cdot(n-4)+4+xm$ $r_5\cdot(n-4)+13+xm$, or its neighboring areas. Therefore, taking into account shift amount xm expressed in number of pixels, starting position ks and ending position ke for correlation calculation using formula (2) are set at $(5\cdot(n-4)+4+xm-s_1)$ and $(5\cdot(n-4)+14+xm+s_2)$, respectively. Here, $s_1$ and $s_2$ should be values within several pixels, preferably one or two. By setting such a reference area, correlation calculation referring to areas having a small likelihood of matching can be avoided.

Through correlation calculation using formula (2), the reference portion area that provides the smallest non-match amount is sought for each of the three sub-blocks and the shift amount expressed in number of pixels for each sub-block is calculated. Interpolation is then performed and the post-interpolation shift amount and non-match amount are calculated. The contrast value of the sub-block is then calculated and the degree of image non-matching is obtained for each sub-block by dividing the post-interpolation non-match amount by the contrast value. It is then determined whether or not focus detection is possible regarding each sub-block based on the contrast value and the degree of image non-matching. These routines are the same as the routines for the first through third pixel blocks before they are divided.

From among the sub-blocks as to which focus detection is possible, the one that indicates the largest post-interpolation shift amount is selected as the sub-block to be used for focus detection. Where two or more sub-blocks indicate the largest post-interpolation shift amount, the one having the smallest degree of non-matching is selected. The post-interpolation shift amount of the selected sub-block is deemed XM', which is compared with post-interpolation shift amount XM of the selected pixel block before division in order to calculate the relative shift amount between the left image and the right image in which the influence of the coincidence of closer and farther objects is eliminated.

Where pre-division shift amount XM is equal to or smaller than post-division correlative shift amount XM', or in other words, where the object distance detected using a sub-block is equal to or smaller than the object distance detected using a pre-division block, shift amount XM' detected using the sub-block can be deemed to accurately indicate the location of the main photo object. In this case, the relative shift amount is set as XM'.

On the other hand, pre-division shift amount XM is larger than shift amount XM' using a sub-block when the object distance detected using the sub-block is larger than the object distance detected using the pre-division block. Here, since pre-division block shift amount XM is influenced by a photo object detected using the sub-block, the main photo object is deemed to be closer to the camera than the location indicated by XM by as much as (XM–XM'). Accordingly, the relative shift amount is set as XM+(XM–XM').

Where focus detection is not possible with any of the three sub-blocks, pre-division shift amount XM is deemed the relative shift amount. In this way, where the coincidence of closer and farther objects is present, the relative shift amount between the image of the standard portion and the image of the reference portion is set as one of three values, XM', XM+(XM–XM') or XM, based on the detection results using pre-division and post-division blocks, and the out-of-focus amount is calculated from this relative shift amount.

Figure 8:
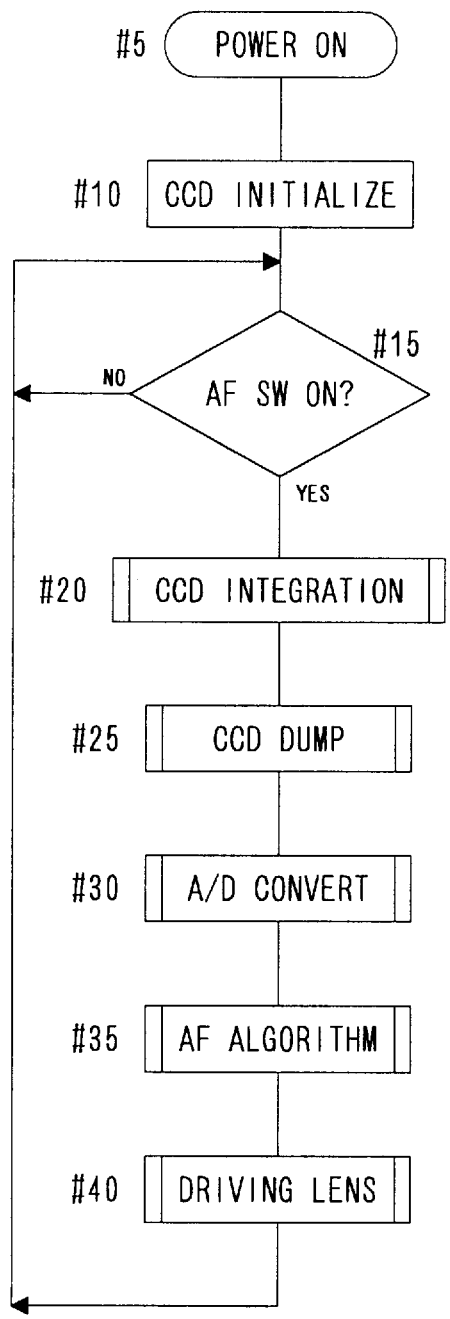
FIG. 8 is a flow chart showing the entire processing sequence of a signal processor of the first embodiment.

The routine of signal processor 7 of this embodiment that performs focus detection using the method above will be explained with reference to FIGS. 8 through 13. FIG. 8 shows the basic sequence of the routine. When power is turned ON in step #5, CCDs 15L and 15R are initialized in step #10 and the setting of autofocus switch (AF switch) 16 is determined in step #15. AF switch 16 may be closed via the pressing of shutter release button 101 to the first click, for example. Alternatively, a dedicated operation member may be used. Where AF switch 16 is OFF, the determination in step #15 is repeated until it turns ON. Where AF switch 16 is ON, the process advances to step #20, in which the light passing through photo-taking lens 1 is received by the CCDs. The light is then converted into an electrical charge and accumulated. Integration data from the CCDs are taken out in step #25 and the data are converted into digital signals in step #30.

The relative shift amount that is the base amount for indicating the focal status of the photo-taking lens is calculated in step #35 via an autofocus algorithm (described below with reference to FIG. 9) using the digitized integration data. In step #40, the amount of displacement of the photo-taking lens from the in-focus position is calculated based on the relative shift amount and the photo-taking lens is driven to perform focus adjustment. Then step #15 is returned to, and if AF switch 16 is ON, the routine described above is repeated and focus adjustment continues.

Figure 9:
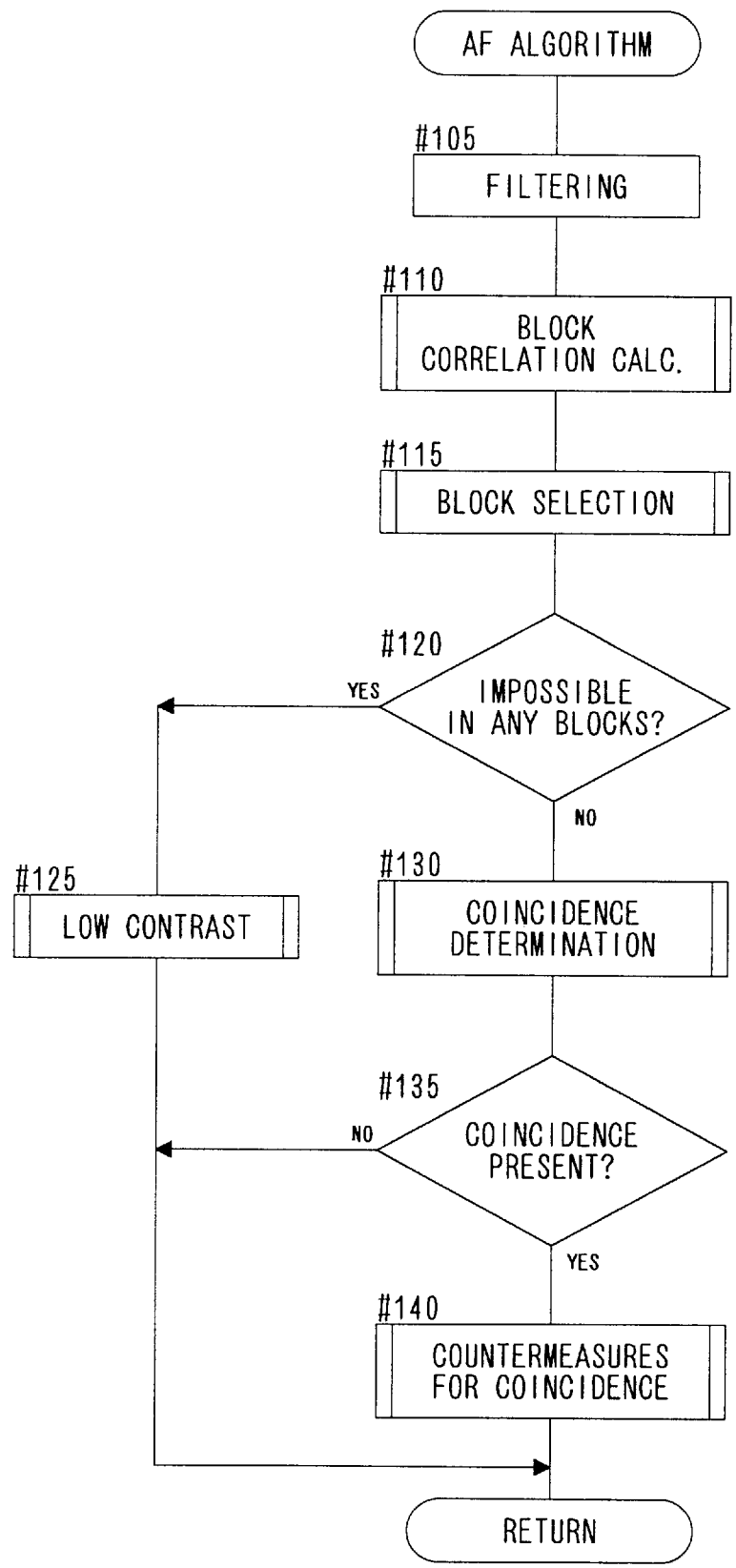
FIG. 9 is a flow chart showing the autofocus algorithm of the signal processor.

FIG. 9 shows the sequence of the autofocus algorithm routine. In step #105, filtering is performed in which differences are obtained from every fourth pixel regarding the pixel data (B1 through B44, R1 through R52) output from the CCDs and then digitized, and the data is converted into pixel data for correlation calculation ($b_1$ through $b_{40}$, $r_1$ through $r_{48}$). Then, in step #110, correlation calculation is performed as to the first, second and third pixel blocks shown in FIG. 4, and it is determined whether focus detection is possible for each block (described below with reference to FIG. 10). Through the block correlation calculation, the shift amount that indicates the displacement between the image of the standard portion and the image of the reference portion, the contrast of the standard portion and the degree of image non-matching between the standard portion and the reference portion are calculated. Based on these values, the block to be used for focus detection is selected in step #115 (described below with reference to FIG. 11).

If it is determined in step #120 that focus detection is not possible as to any of the blocks based on the result of the determination in step #110 whether or not focus detection is possible regarding each block, the process advances to step #125, in which a low contrast routine takes place. Specifically, a focus detection impossible flag is set to 1, and focus detection impossible is displayed on display device 11. When the value of focus detection impossible flag is 1, the driving of the photo-taking lens described above does not take place in step #40 in FIG. 8. Where focus detection is possible as to more than one pixel block, it is determined in step #130 whether or not the coincidence of closer and farther objects is present (described below with reference to FIG. 12). If it is determined in step #135 that the coincidence of closer and farther objects is present, the routine executing countermeasures for the coincidence of closer and farther objects (described below with reference to FIG. 13) takes place in step #140.

Figure 10:
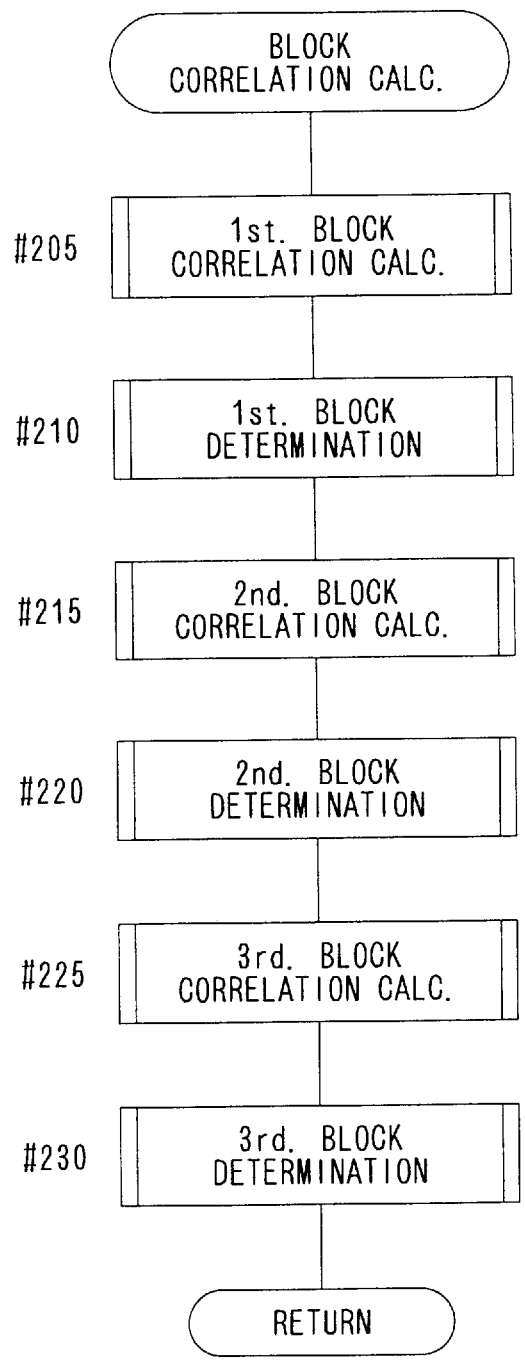
FIG. 10 is a flow chart showing the processing sequence for block correlation calculation in the signal processor.

FIG. 10 shows the sequence of the block correlation calculation routine. First in step #205, non-match amounts $H_1(1)$ through $H_1(29)$ are calculated regarding the first block ($b_1$ through $b_{20}$) of the standard portion using formula (1), and the smallest value $H_1(km)$ is sought. Shift amount $xm_1$ expressed in number of pixels is calculated from km that provides the smallest value, and $km^o$ is obtained through interpolation, following which post-interpolation shift amount XM, is calculated. Non-match amount $YM_1$ that corresponds to the post-interpolation shift amount and contrast value $C_1$ using formula (5) are then calculated. Degree of image non-matching $YM_1/C_1$ is sought from non-match amount $YM_1$ and contrast value $C_1$, and all of these values are stored in a memory. It is determined in step #210 that focus detection using the first block is possible if contrast value $C_1$ is larger than prescribed value $C_o$ and degree of image non-matching $YM_1/C_1$ is smaller than prescribed value $(YM/C)_o$. It is determined that focus detection using the first block is not possible in all other cases. In step #215, correlation calculation is similarly performed as to the second pixel block, and shift amount $xm_2$ expressed in number of pixels, post-interpolation shift amount $XM_2$, non-match amount $YM_2$, contrast value $C_2$ and degree of image non-matching $YM_2/C_2$ are calculated. In step #220, it is determined whether or not focus detection is possible. Correlation calculation and determination as to whether or not focus detection is possible are performed in the same manner for the third pixel block in steps #225 and #230, respectively.

Figure 11:
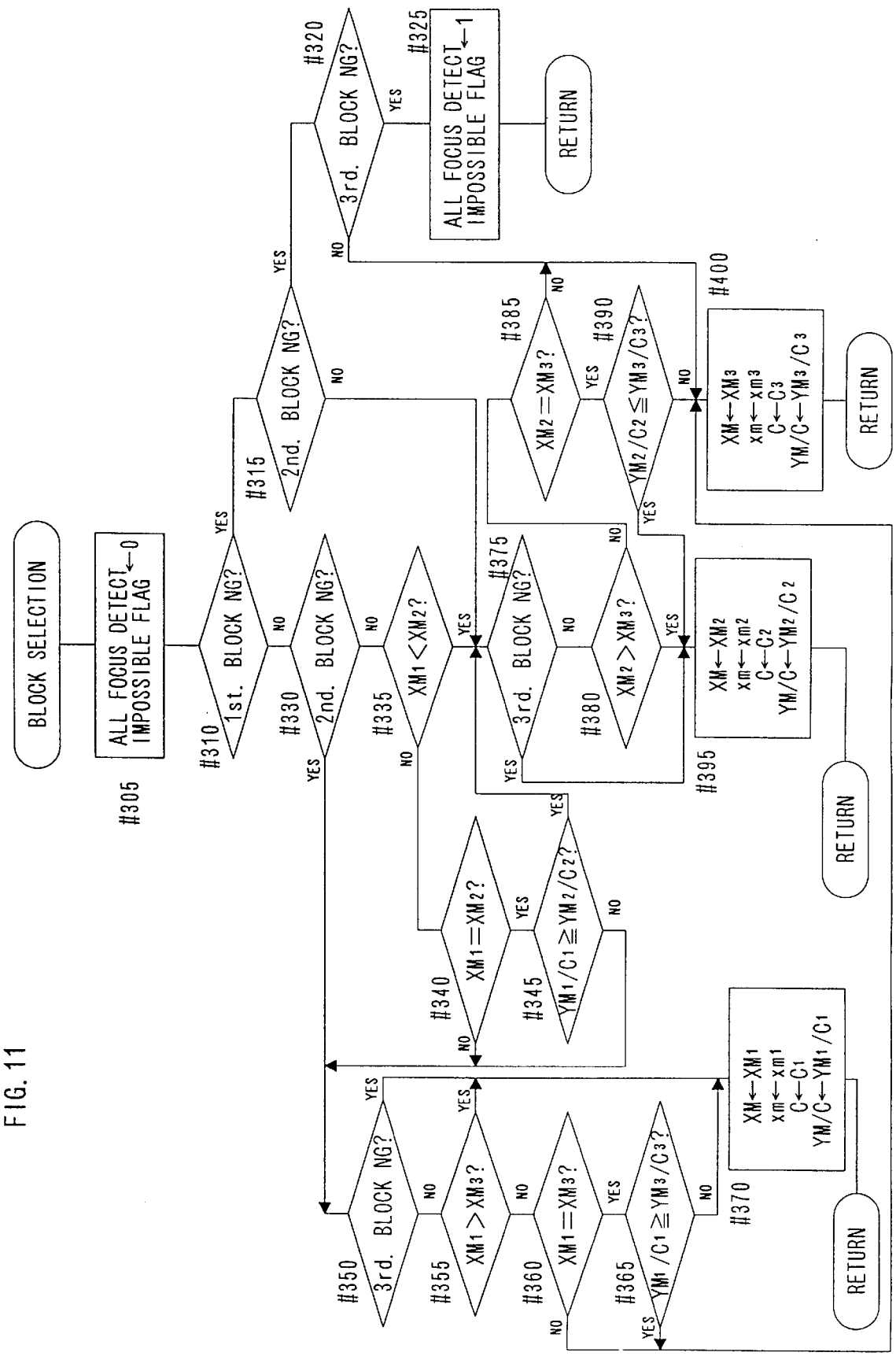
FIG. 11 is a flow chart showing the processing sequence for block selection in the signal processor.

FIG. 11 shows the sequence of the block selection routine. In this routine, the block having the largest post-interpolation shift amount is selected from among the first through third pixel blocks, and where any of the blocks have the same post-interpolation shift amount, the one having the smallest degree of image non-matching is selected.

First, in step #305, the focus detection impossible flag is cleared. Then, in step #310, the determination result obtained during block correlation calculation (step #210 in FIG. 10) is checked. Where focus detection using the first block is possible, the process advances to step #330, and where it is not possible, the process advances to step #315. In step #315, the determination result for the second block (step #220 in FIG. 10) is checked. Where focus detection using the second block is possible, the process advances to step #375, and where it is not possible, the process advances to step #320. In step #320, the determination result pertaining to the third block (step #230 in FIG. 10) is checked. Where focus detection using the third block is possible, the process advances to step #400. If focus detection using the third block is not possible here, it means that focus detection is not possible using any of the first through third pixel blocks, and the focus detection impossible flag is set to 1 in step #325.

Where focus detection using the first block is possible, the determination result as to the second block is checked in step #330. Where focus detection using the second block is possible, post-interpolation shift amounts $XM_1$ and $XM_2$ of the first and second blocks are compared in step #335. If shift amount $XM_1$ of the first block is smaller, the process advances to step #375, and otherwise the process advances to step #340. In step #340, shift amounts $XM_1$ and $XM_2$ of the first and second blocks are compared. If they are the same, the process advances to step #345, and if they are not, the process advances to step #350. In step #345, degrees of image non-matching $YM_1/C_1$ and $YM_2/C_2$ of the first and second blocks are compared. If degree of non-matching $YM_1/C_1$ of the first block is smaller, the process advances to step #350, and otherwise the process advances to step #375.

Based on the determinations in steps #335, #340 and #345, the block having the larger post-interpolation shift amount is selected from among the first and second pixel blocks. Where their shift amounts are the same, the one with the smaller degree non-matching is selected. When the first block is selected, the process goes to step #350, and when the second block is selected, the process goes to step #375.

In step #350, the determination result for the third block is checked. If focus detection using the third block is possible, the process advances to step #355 and if it is not possible, the process advances to step #370. In steps #355, #360 and #365, post-interpolation shift amounts $XM_1$ and $XM_3$ and degree of image non-matching $YM_1/C_1$ and $YM_3/C_3$ of the first and third blocks are compared respectively in the same manner as in steps #335, #340 and #345, and the one with the larger post-interpolation shift amount is selected. If their post-interpolation shift amounts are the same, the one with the smaller degree of non-matching is selected. When the first block is selected in step #355 or #365, or when focus detection using the third block is not possible in the determination in step #350, post-interpolation shift amount $XM_1$, shift amount $xm_1$ expressed in number of pixels, contrast value $C_1$ and degree of image non-matching XM1/C1 of the first pixel block are stored in memory as selected values.

Where it is determined in steps #310 and #315 that focus detection is not possible using the first block, but is possible using the second block, or where the second block is selected in step #335 or #345, the determination result regarding focus detection using the third block is checked in step #375. If focus detection is possible using the third block, the process advances to step #380, and if it is not possible, the process advances to step #395. In steps #380, #385 and #390, the pixel block with the larger post-interpolation shift amount is selected from between the second and third blocks. If their post-interpolation shift amounts are the same, the one with the smaller degree of image non-matching is selected. Where the second block is selected, post-interpolation shift amount $XM_2$, shift amount $xm_2$ expressed in number of pixels, contrast value $C_2$ and degree of image non-matching $XM_2/C_2$ of the second pixel block are stored in memory in step #395.

Where the third block is selected through the determinations in steps #360 and #365, the third block is selected through the determinations in steps #385 and #390, or only focus detection using the third block is deemed possible through the determinations in steps #315 and #320, post-interpolation shift amount $XM_3$, shift amount $xm_3$ expressed in number of pixels, contrast value C3 and degree of image non-matching $XM_3/C_3$ of the third pixel block are stored in memory in step #400.

Where focus detection is possible with one or more pixel blocks of the first through third blocks via the above process, the pixel block which has the largest post-interpolation shift amount is selected. If there are two or more pixel blocks having the largest post-interpolation shift amount, the pixel block which has the smallest degree of image non-matching is selected from among them.

Figure 12:
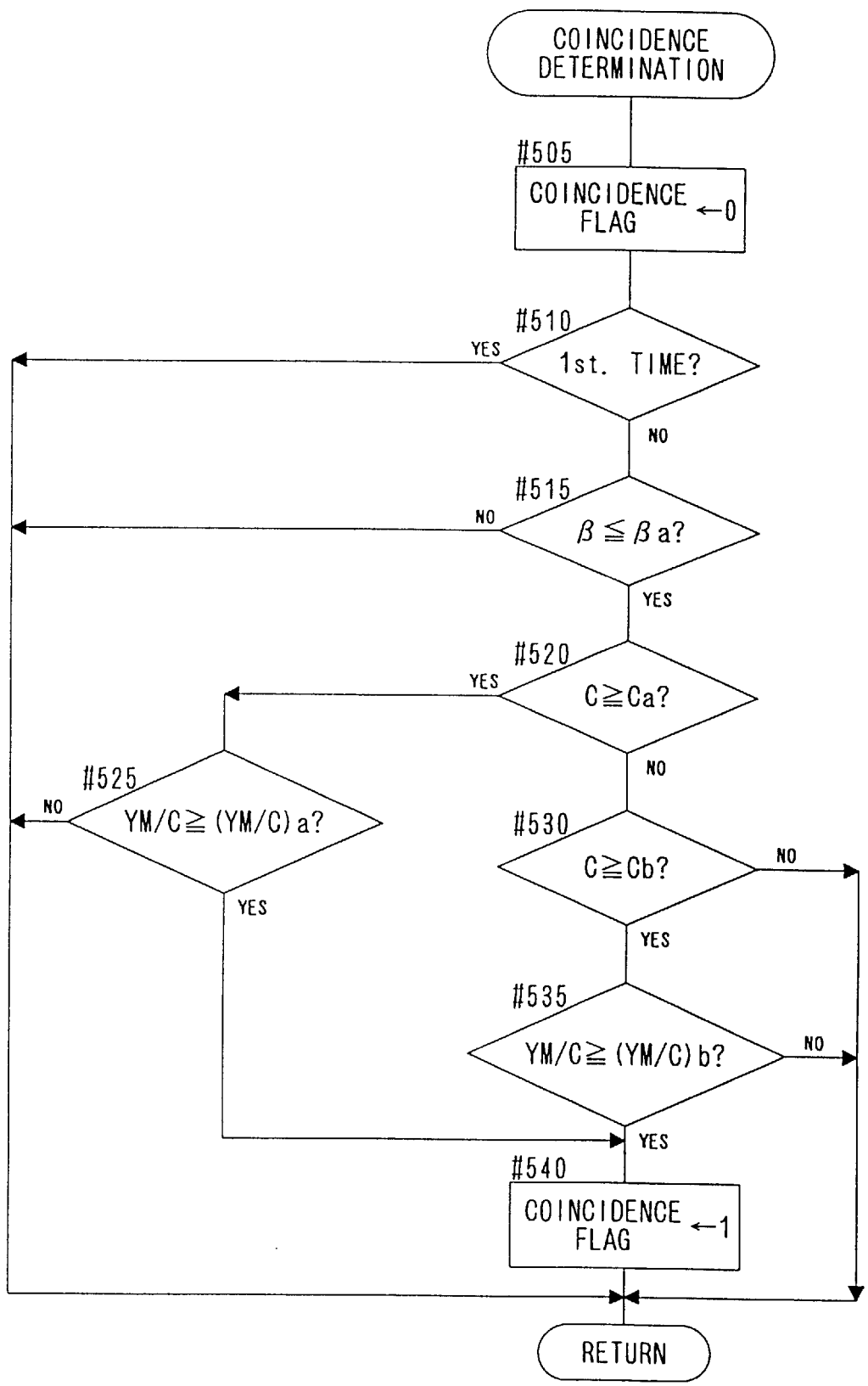
FIG. 12 is a flow chart showing the processing sequence for determination regarding the coincidence of closer and farther objects in the signal processor.

FIG. 12 shows the flow of the routine to determine presence or absence of the coincidence of closer and farther objects. First, in step #505, the objects coincidence flag is cleared. This routine to determine the presence or absence of the coincidence of closer and farther objects is called via the autofocus algorithm, which is repeatedly operated when the autofocus switch is ON as shown in FIG. 8, and focus detection is repeated. In step #510, it is determined whether or not the autofocus algorithm routine is being operated for the first time after the AF switch is turned ON. In other words, it is determined whether or not it is the first focus detection. If it is the first focus detection, determination regarding the presence or absence of the coincidence of closer and farther objects is not performed, and the routine comes to an end. With the second focus detection and thereafter, the process advances to step #515.

In step #515, object magnification β that was calculated in the previous focus detection routine is compared with prescribed value $β_a$. If previous object magnification β is equal to or smaller than prescribed value $β_a$, the process advances to step #520. Where the object magnification is larger, it is quite unlikely that the coincidence of closer and farther objects is occurring, and therefore determination as to the presence or absence of the coincidence of closer and farther objects does not take place where previous object magnification β is larger than prescribed value $β_a$.

The presence or absence of the coincidence of closer and farther objects is then determined based on contrast value C and degree of image non-matching YM/C of the pixel block selected in the block selection routine shown in FIG. 11. Contrast value C is compared with first prescribed value $C_a$ in step #520, and if contrast value C is equal to or larger than prescribed value $C_a$, the process advances to step #525, where degree of image non-matching YM/C is compared with first prescribed value $(YM/C)_a$. If degree of image non-matching YM/C is equal to or larger than prescribed value $(YM/C)_a$, it is determined that the coincidence of closer and farther objects is present, and the process advances to step #540. If it is smaller than prescribed value $(YM/C)_a$, it is determined that the coincidence of closer and farther objects is not present and the routine comes to an end.

Where contrast value C is smaller than first prescribed value $C_a$ in step #520, contrast value C is compared in step #530 with second prescribed value $C_b$, which is smaller than first prescribed value $C_a$. If contrast value C is smaller than prescribed value $C_b$, it is determined that the coincidence of closer and farther objects is not present and the routine comes to an end. If contrast value C is equal to or larger than second prescribed value $C_b$, the process advances to step #535 where degree of image non-matching YM/C is compared with second prescribed value $(YM/C)_b$ which is smaller than first prescribed value $(YM/C)_a$. If degree of image non-matching YM/C is equal to or larger than prescribed value $(YM/C)_b$, it is determined that the coincidence of closer and farther objects is present, and the process advances to step #540. If it is smaller than prescribed value $(YM/C)_b$, it is determined that the coincidence of closer and farther objects is not present and the routine comes to an end.

Where it is determined in step #525 or #535 that the coincidence of closer and farther objects is present, the objects coincidence flag is set to 1 in step #540 and the routine to determine the presence or absence of the coincidence of closer and farther objects comes to an end.

Figure 13:
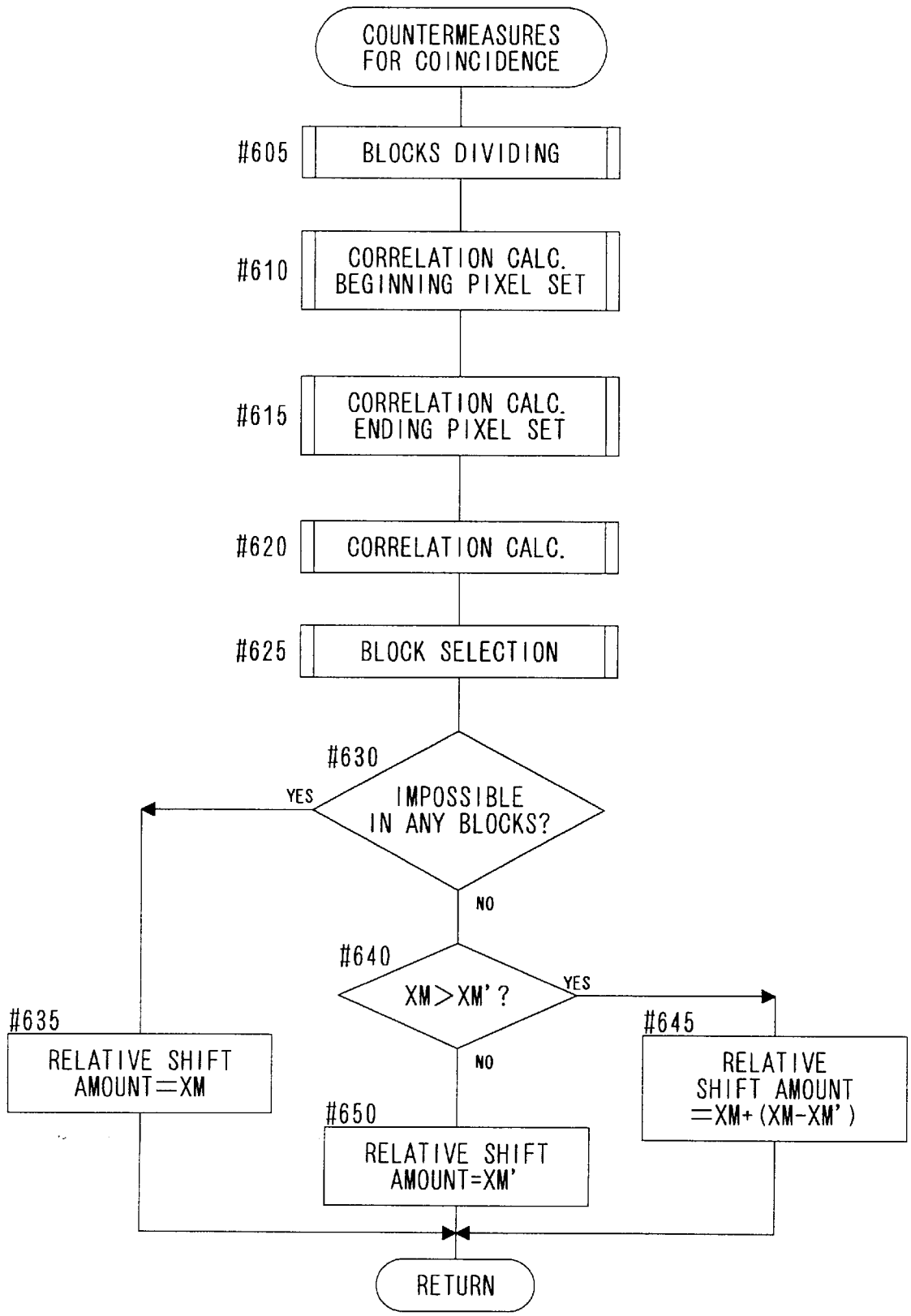
FIG. 13 is a flow chart showing the processing sequence for countermeasures for the coincidence of closer and farther objects in the signal processor.

FIG. 13 shows the sequence of the routine of countermeasures for the coincidence of closer and farther objects. First, the blocks are divided in step #605. Then, in steps #610 and #615, the area of the reference portion as to which correlation calculation will be performed pertaining to the smaller blocks of the standard portion is set based on the shift amount xm for the pre-division selected block expressed in number of pixels. In step #620, calculation of correlation between the standard portion and the reference portion is performed as to the three sub-blocks. This process is the same as that shown in FIG. 10, where the shift amount expressed in number of pixels, post-interpolation shift amount, contrast and degree of image non-matching for each sub-block are calculated. In addition, based on the contrast and degree of image non-matching, it is determined whether or not focus detection is possible using each sub-block. Then, in step #625, the sub-block to be used for focus detection is selected. This selection is performed in the same way as the selection routine shown in FIG. 11. In other words, it is determined whether or not focus detection is possible for each of the three sub-blocks, and where it is possible using one or more sub-blocks, the sub-block having the largest post-interpolation shift amount is selected. If more than one sub-blocks indicate the largest post-interpolation shift amount, the one with the smallest degree of image non-matching is selected. The post-interpolation shift amount of the sub-block selected in this way is stored in memory as correlative shift amount XM'.

The results of the determination as to whether or not focus detection is possible with regard to the three sub-blocks is checked in step #630, and where focus detection is not possible with any of the sub-blocks, the process advances to step #635 and post-interpolation shift amount XM for the pre-division pixel block, which has already been calculated, is set as the relative shift amount. Where focus detection is possible with one or more sub-blocks, the process advances to step #640, where post-interpolation shift amount XM for the pre-division pixel block and post-division correlative shift amount XM' stored in memory in step #625 are compared.

Where pre-division shift amount XM is larger than post-division shift amount XM', the photo object is deemed to be closer than the location indicated by XM by as much as (XM−XM'), and the relative shift amount is set as XM+(XM−XM') in step #645. On the other hand, where pre-division shift amount XM is smaller than correlative shift amount XM', shift amount XM' detected with the sub-block is deemed to accurately indicate the location of the photo object, and the relative shift amount is set as XM' in step #650.

As described above, in the single lens reflex camera of this embodiment, focus detection is first performed using one of the first through third pixel blocks, and where the coincidence of closer and farther objects is not present, the photo-taking lens is driven based on the shift amount between the left and right images detected such that the lens will be focused on the main photo object. Where the coincidence of closer and farther objects is present, the pixel block with which focus detection was performed is further divided into smaller sub-blocks and focus detection is performed using one of the sub-blocks. The photo-taking lens is then driven based on the shift amount between the left and right images detected using the sub-block and the shift amount detected using the pixel block before the division, such that the lens will be focused on the main photo object.

The numbers of pixels of the left and right CCDs are not limited to the numbers mentioned above. They may be set at any values depending on the width of the photo-taking range over which focus detection is performed or the arrangement pitch of the pixels. In this embodiment, the number of pixel blocks used for regular focus detection is set at three, with each of the blocks comprising 20 pixels. However, the number of pixel blocks and the number of pixels comprising the pixel block may be set at other values as well.

Furthermore, the number of pixels in each pixel block does not have to be set the same. Moreover, where the coincidence of closer and farther objects is present, the pixel block does not have to be divided into three small pixel blocks: it may be divided into more blocks or the numbers of pixels of the sub-blocks may be set differently from one another.

The second embodiment of the present invention will now be explained. The construction of the hardware of this embodiment is the same as in the first embodiment described above, and therefore repetitive explanations will be omitted. In the first embodiment, focus detection was performed with the first through third pixel blocks used for regular focus detection fixed at predetermined positions. In this embodiment, the positions of the first through third pixel blocks are determined based on the contrast values.

Figure 15:
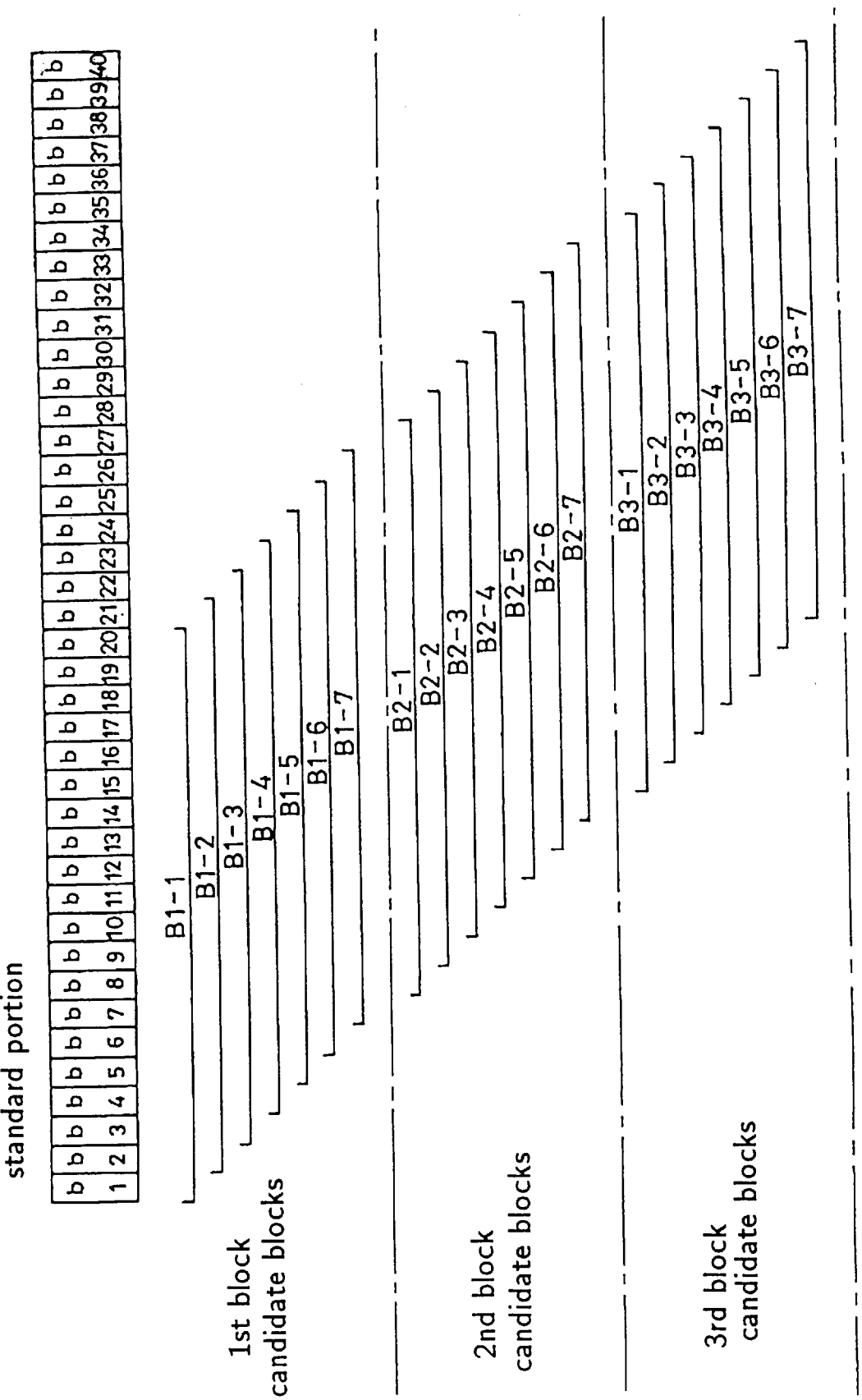
FIG. 15 is a drawing that shows the relationships among candidate pixel block positions of the standard portion in a second embodiment of the present invention.

Among pixels $b_1$ through $b_{40}$ of the standard portion, pixels $b_1$ through $b_{26}$ are deemed the candidate area for the first pixel block, pixels $b_8$ through $b_{33}$ are deemed the candidate area for the second pixel block and pixels $b_{15}$ through $b_{40}$ are deemed the candidate area for the third pixel block. Seven candidate blocks B1-1 through B1-7, each comprising twenty adjacent pixels, are set in the first candidate area. In the same way, seven candidate blocks B2-1 through B2-7 and B3-1 through B3-7 are respectively set in the second and third candidate areas, respectively. These candidate blocks are shown in FIG. 15.

Contrast value $C_{n-k}$ is calculated using formula (7) for candidate block Bn-k which is the kth candidate block in the nth candidate area.

$$C_{n-k} = \sum_{j=1}^{19} |b_{7 \cdot (n-1)+k+j-1} - b_{7 \cdot (n-1)+k+j-1}| \qquad (7)$$

Among the seven candidate blocks of each candidate area, the block having the largest contrast value $C_{n-k}$ is selected as the pixel block for that candidate area. For example, if $C_{1-3}$ is the largest among $C_{1-1}$ through $C_{1-7}$, $B_{1-3}$ is designated as the first pixel block. Here the pixel block's contrast value $C_1$ is $C_{1-3}$.

Correlation calculation is performed for each of the first through third pixel blocks selected in this way referring to the entire reference portion, and non-match amounts are calculated. Although the in-focus position on the reference portion corresponding to each pixel block is different from the positions shown in FIG. 4, shift amount $xm_n$, between the left and right images expressed in number of pixels is sought based on the displacement amount of the position on the reference portion that shows the smallest non-match amount, relative to the in-focus position. Further, interpolation is performed, and post-interpolation shift amount $XM_n$ and post-interpolation non-match amount $YM_n$ are calculated. Post-interpolation non-match amount $YM_n$ is then divided by contrast value $C_n$ such that degree of image non-matching $YM_n/C_n$ may be obtained.

Figure 16:
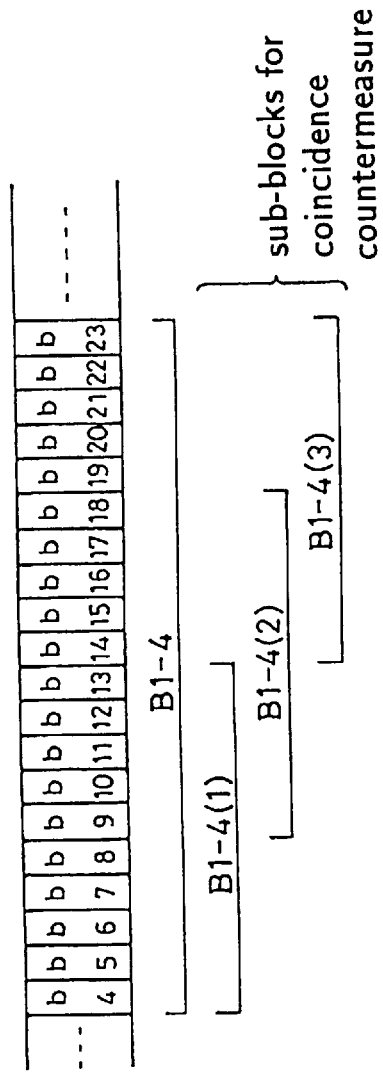
FIG. 16 is a drawing that shows an example of the division of pixel blocks of the standard portion in the second embodiment of the present invention.

Subsequently, the pixel block with which focus detection is to be performed is selected from among the first through third pixel blocks in the same manner as in the first embodiment, and the presence or absence of the coincidence of closer and farther objects is checked. Where the coincidence of closer and farther objects is not present, the photo-taking lens is adjusted to the in-focus position based on post-interpolation shift amount XM of the pixel block selected.

Where the coincidence of closer and farther objects is present, the object coincidence countermeasure routine, in which the selected pixel block is divided into three pixel blocks, each of which comprises ten pixels, takes place. FIG. 16 shows an example of a pixel block division. In this example, pixel block B1-4 is selected and sub-blocks B1-4(1) through B1-4(3) are set. Correlation calculation is then performed for each of the sub-blocks in the same manner as in the first embodiment, and one sub-block is selected. The relative shift amount is sought based on post-interpolation shift amount XM' of the selected block, and post-interpolation shift amount XM of the selected pre-division pixel block and the position of the focus of the photo-taking lens is adjusted.

Since pixel blocks with high contrasts are used as the first through third pixel blocks in the method of this embodiment, error is reduced in detecting the out-of-focus amount and accuracy in setting the position of the focus of the photo-taking lens improves.

While a single lens reflex camera was shown as one example of optical equipment of the present invention in the embodiments described above, the present invention may be applied in other equipment having focus detection devices, such as lens shutter cameras, binoculars and measuring devices.

Obviously, many modifications and variation of the present invention are possible in light of the above teachings. It is therefore to be understood that within the scope of the appended claims, the invention may be practiced other than as specifically described.

What is claimed is:

1. A focus detection device, including an optical system which forms first and second images, and a sensor having photodetector elements which detect said first and second images, for detecting a focus condition of an objective lens based on a relative position between said first and second images, said device comprising:

a first focus detector which divides said first image into plural areas and detects a first relative distance between said first and second images;

a second focus detector which divides one of said areas into smaller areas and uses said smaller areas to detect a second relative distance between said first and second images; and a calculator which calculates a final relative distance based on one of said first and second relative distances.

2. A focus detection device as claimed in claim 1, further comprising:

a determiner which determines whether or not closer and farther objects exist in said one of said areas provided by said first focus detector; and a controller which controls operations of said first and second focus detectors;

wherein said controller controls an operation of said second focus detector based on a determination by said determiner.

3. A focus detection device as claimed in claim 2, wherein said controller operates said second focus detector when it is determined that closer and farther objects exist in said one of said areas provided by said first focus detector.

4. A focus detection device as claimed in claim 2, wherein said determiner operates based on a contrast of said one of said areas provided by said first focus detector and a correlation between said first and second images.

5. A focus detection device as claimed in claim 2, wherein said determiner operates based on an object magnification.

6. A focus detection device as claimed in claim 5, wherein said controller operates said second focus detector when said determiner determines said object magnification is larger than a predetermined value.

7. A focus detection device as claimed in claim 1, wherein said second focus detector detects said second relative distance that is in a predetermined range of said first relative distance detected by said first focus detector.

8. A focus detection device as claimed in claim 1,
wherein said controller prevents said second focus detector from operating when focus detection is executed for the first time.

9. A focus detection device, including an optical system which forms a first image and a second image, and a sensor having photodetector elements which detect said first and second images, for detecting a focus condition of an objective lens based on a relative position between said first and second images, said device comprising:

a selector which divides said first image into plural areas and selects an area having a highest contrast in said plural areas;

a first focus detector which uses a thus selected area to detect a first relative distance between said first and second images;

a second focus detector which divides said selected area into smaller areas and uses said smaller areas to detect a second relative distance between said first and second images; and a calculator which calculates a final relative distance based on one of said first and second relative distances.

10. A focus detection device as claimed in claim 9, further comprising:

a determiner which determines whether or not closer and farther objects exist in said selected area; and a controller which controls operations of said first and second focus detectors;

wherein said controller controls an operation of said second focus detector based on a determination of said determiner.

11. A focus detection device as claimed in claim 10, wherein said controller operates said second focus detector when it is determined closer and farther objects exist in said selected area.

12. A focus detection device as claimed in claim 10, wherein said determiner operates based on a contrast of said selected area and a correlation between said first and second images.

13. A focus detection device as claimed in claim 10, wherein said determiner operates based on an object magnification.

14. A focus detection device as claimed in claim 13, wherein said controller operates said second focus detector when said determiner determines that said object magnification is larger than a predetermined value.

15. A focus detection device, comprising:

a first focus detector which detects focus condition of a taking lens to a predetermined area in an object field;

a determiner which determines whether or not closer and farther objects exist in said predetermined area;

a divider which divides said predetermined area into smaller areas when said determiner determines closer and farther objects exist in said predetermined area;

a second focus detector which detects focus condition in said smaller areas;

a magnification calculator which calculates an object magnification;

a controller which controls an operation of said focus detector based on said object magnification.

16. A focus detection device as claimed in claim 15, wherein said controller operates said second focus detector when said object magnification is larger than a predetermined value.

17. A focus detection device as claimed in claim 15, wherein said determined operates based on a contrast of said predetermined area and correlation between said first and second images.

18. An optical apparatus having a focus detection device, said apparatus comprising:

an objective lens;

an optical system which is located behind said objective lens and forms first and second images;

a sensor having photodetector elements which detect said first and second images;

a first focus detector which divides said first image into plural areas and detects a first relative distance between said first and second images;

a second focus detector which divides one of said areas into smaller areas and utilizes said smaller areas to detect a second relative distance between said first and second images;

a calculator which calculates a final relative distance based on one of said first and second relative distances; and a controller which controls said objective lens in focus position based on said final relative distance.

19. A focus detection device as claimed in claim 18, further comprising:

a determiner which determines whether or not closer and farther objects exist in said one of said areas provided by said first focus detector, and wherein said controller controls an operation of said second focus detector based on a determination by said determiner.

* * * * *